Nov. 30, 1937.   C. F. KRAMER   2,100,546
AUTOMOBILE SEAT TRACK CONSTRUCTION
Filed Aug. 15, 1936
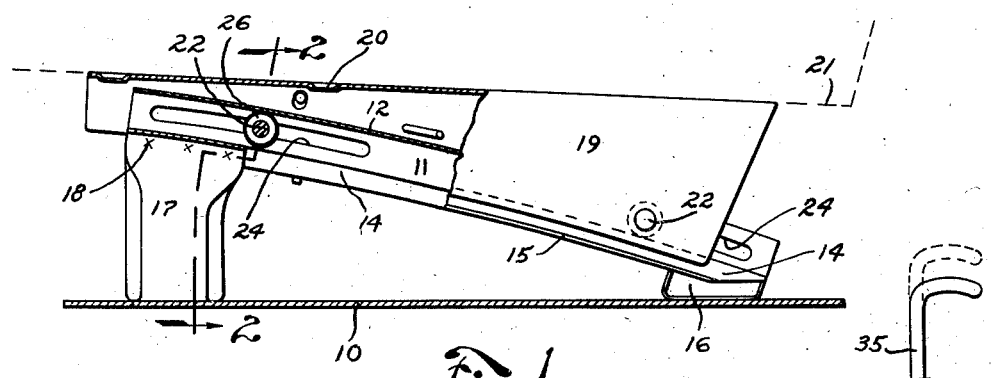
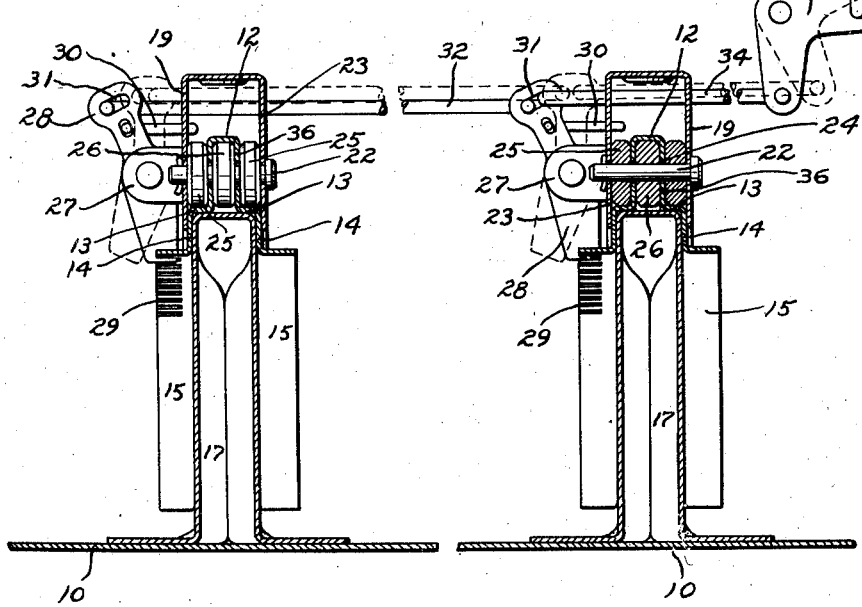
INVENTOR.
Clarence F Kramer
BY
ATTORNEY.

UNITED STATES PATENT OFFICE 2,100,546

AUTOMOBILE SEAT TRACK CONSTRUCTION

Clarence F. Kramer, Detroit, Mich., assignor to Ford Motor Company, Dearborn, Mich., a corporation of Delaware Application August 15, 1936, Serial No. 96,235

5 Claims. (Cl. 155—14)

The object of my invention is to provide a track construction which is adapted to adjustably support an automobile seat, the function of the track being to allow the seat to be moved forwardly or rearwardly to suit the requirements of individual occupants of the vehicle.

A novel feature of my improved device is that the carriage portion of the device or that portion to which the seat proper is secured, is both supported and retained upon the track by means of a plurality of rollers whereby movement of the carriage upon the track is facilitated. Seat tracks have been designed in the past in which the carriage portion was mounted upon rollers; however, in all of such constructions known to the applicant the rollers supported the carriage only against a downward load upon the seat, such as the weight of the occupant. In my improved construction certain rollers are provided to support the weight of the occupant and other rollers are provided which prevent lifting of the seat.

The utility of the aforementioned device will be apparent when it is realized that the fore and aft movement of the seat is invariably accomplished by the occupant pushing upon the seat's back. When the seat back is pushed rearwardly the front portion of the seat carriage is raised upwardly and, in all previous constructions known to the applicant, the front end of the carriage had a tendency to bind against whatever retaining flanges or devices which were provided to prevent the carriage from raising from the track. In the applicant's device, raising of either the front or rear portion of the seat is prevented by rollers so that free movement of the seat both fore and aft is obtained without binding.

With these and other objects in view, my invention consists in the arrangement, construction and combination of the various parts of my improved device, as described in the specification, claimed in my claims, and illustrated in the accompanying drawing, in which:

Figure 1 shows a side elevation of my improved seat track, the front portion of the carriage and track being broken away to better illustrate the construction, and Figure 2 is a sectional view, taken on the line 2—2 of Figure 1.

Referring to the accompanying drawing, I have used the reference numeral 10 to indicate the floor of a motor vehicle to which my improved seat track is adapted to be secured. The tracks proper comprise a pair of inverted U-shaped channel members 11 which are formed slightly convex from end to end, as shown in Figure 1. The web of each channel is numbered 12 and forms an upper track while flanges 13 extend outwardly from the channel arms 36 to form a lower track. Stiffening ribs 14 extend downwardly from each outer edge of the flanges 13 and flanges 15 extend outwardly from the lower edges of the ribs 14.

The rearmost end of each of the members 11, just described, is supported upon a bracket 16 while the forward end is supported in a raised position by a somewhat higher bracket 17. As will be noted from Figure 1, the bracket 17 extends upwardly between the ribs 14 and bears against the underside of the tracks 13 to support the unit. Both brackets 16 and 17 are spot-welded, as shown at 18, to the ribs 14 to thus form a unitary structure comprising brackets 16 and 17 and channel 11.

A seat carriage is mounted to roll upon these track members and comprises a pair of inverted channel-shaped sections 19, the central web of each section having a plurality of openings therein through which screws extend into the bottom of the seat proper to secure the carriage to the seat. The seat proper is shown by dotted lines 21. It will be noted that pins 22 extend transversely through the arms 23 of the channels 19, there being a pin projecting through each arm at each end thereof. The arms 23 extend down over the ribs 14 to thereby prevent lateral movement of the carriage upon the track. Each of the arms 36 is provided with a pair of arcuate slots 24 therein through which the pins 22 extend. It will be seen that the length of the slots 24 determine the length of travel of the carriage upon the tracks.

Rotatably mounted upon each pin 22 I have provided three rollers, the two outside rollers being given a numeral 25 while the center roller is given the numeral 26. Both of the outside rollers 25 roll upon the upper edge of the tracks 13 to thus support the weight of the seat and occupant. The center roller 26 is mounted between the arms 36 and rolls against the underside of the upper track 12 and prevents the channel 19 from raising upwardly. There is sufficient clearance between the edges of the slots 24 and the pins 22 so that the pins do not slide against the edges of the slots. However, the ends of the slots 24 limit the movement of the carriage 19.

From the foregoing it will be seen that the weight of the seat is normally carried through the outer rollers 25 to the tracks 13. When the seat back is either pushed or pulled the weight of one end of each carriage is raised at which time such movement is resisted by the center roller bearing against the underside of the track 12. Fore and aft movement of the seat may therefore be readily accomplished without binding of the carriage upon the seat track.

In order that the seat may be locked in any one of the plurality of positions along its path of movement, I have provided a pair of ears 27 which extend outwardly from one side of each channel 23. An arm 28 is pivotally mounted between each pair of ears 27. The lower end of each of the arms 28 is adapted to enter any one of a plurality of notches 29 in the adjacent flange 15 to lock the carriage. Springs 30 coact with the arms 28 so that the arms are resiliently urged to position where their lowermost ends enter one of the notches 29. It will be noted that the upper ends of each of the arms 28 are provided with a slotted opening 31 therein and that a link 32 connects these two arms. A bell crank lever 33 is pivotally secured to the seat construction proper, one arm of the bell crank being pivotally connected to a link 34 while the other end is pivotally connected to a vertically extending operating rod 35. The other end of the link 34 is connected to the upper end of the adjacent arm 28.

When the rod 35 is raised, the bell crank 33 is pivoted to thereby move both arms 28 against the action of the springs 30 and thus draw the lower ends of both arms out of the notches 29. When the rod 35 is released the springs 30 urge each arm to coact with its notch independently of the other. A limited movement of each arm is permitted independent of the other, due to the slotted opening 31 in the upper end of each arm. Thus, the arms may be released and each edge of the seat moved independently through a slight distance to selectively engage the arms in the notches. Further, the independent action of these arms presents rattle of the locking mechanism as each is individually urged into contact with the notches to thereby maintain a non-rattling construction.

The principal advantage resulting from the use of my improved seat track construction is that not only the load is supported upon rollers so that the seat is readily moved forwardly and rearwardly but also, the tipping action of the seat is resisted by rollers so that binding between the seat carriage and the track is prevented.

Some changes may be made in the arrangement, construction and combination of the various parts of my improved device without departing from the spirit of my invention, and it is my intention to cover by my claims such changes as may reasonably be included within the scope thereof.

I claim as my invention:

1. A device of the character described comprising, an inverted channel-shaped track member adapted to be fixedly mounted in a vehicle body, said track channel having a lower track flange extending outwardly from its lower edge, at least one arm of said channel having a longitudinal slot therein, an inverted channel-shaped seat carriage extending down over said track channel member, a pin fixed to said seat carriage and extending through said slot in said track channel, and a plurality of rollers mounted on said pin, at least one of said rollers coacting with the lower track to support the weight of said carriage and another of said rollers coacting with the underside of the web of said track channel to prevent raising of the carriage from said track.

2. A device of the character described comprising, an inverted channel-shaped track member adapted to be fixedly mounted in a vehicle body, said track channel having a pair of lower track flanges extending outwardly from its lower edges, the arms of said channel having aligned longitudinal slots therein, an inverted channel-shaped seat carriage extending down over said track channel member, a pin extending through said seat carriage and slots in said track channel, and a plurality of rollers mounted on said pin, at least one of said rollers coacting with the lower track to support the weight of said carriage, and another of said rollers coacting with the underside of the web of said track channel to prevent raising of the carriage from said track.

3. A device of the character described comprising, an inverted channel-shaped track member, a bracket extending downwardly from said member at each end thereof, said bracket being fixedly secured to said member and to the floor of a motor vehicle, said member having a pair of flanges extending outwardly from the lower edges of its channel arms, said channel arms each having a longitudinally extending slot formed therein, an inverted channel-shaped seat carriage extending down over said track member, a pin extending transversely through the arms of said carriage channel and through said slots, a roller disposed on said pin between the arms of said track member which rolls upon the underside of said track member web so as to prevent the raising of said carriage from said track member, and a pair of rollers mounted on said pin between the respective sides of track member and said carriage channel, said rollers rolling upon said flanges, respectively, to support the load of said seat carriage.

4. A seat track construction adapted to adjustably support a seat in a motor vehicle comprising, a pair of inclined tracks each of which comprises an inverted channel-shaped member having the lower edges of the channel arms extending outwardly to form a pair of parallel tracks, said channel arms each having a pair of longitudinally extending slots therein one at each end, ribs extending downwardly from the outer edges of each of said tracks, a pair of sheet metal brackets adapted to support said tracks on the floor of the vehicle, said brackets having a rectangular-shaped portion which extends upwardly between said ribs and bears against the underside of said tracks, said brackets being fixedly secured to said ribs, a pair of inverted channel-shaped carriage members reciprocally mounted on said tracks, respectively, the arms of said carriage members extending down over the outer edges of said ribs so as to prevent lateral movement of the carriage members relative to said track, a pair of pins extending through each of said carriage members, one at each end thereof, said pins also extending through said slots, each of said pins having a pair of rollers rotatably mounted thereon within the arms of said carriage channel so as to roll upon the upper faces of said tracks, and a central roller mounted upon each of said pins within said track channel member adapted to bear against the underside of the web of said track channel, and means for locking said carriage members in various positions along said track members.

5. A seat track construction comprising, a pair of inverted channel-shaped members, a pair of lower tracks extending outwardly from the bottom edges of the channel arms of said members, each of said channel arms having a longitudinally extending slot therethrough, a pair of ribs extending downwardly from the outer edges of each of said tracks, supporting brackets, fixed to each of said tracks at opposite ends thereof, said brackets extending upwardly between said ribs and abutting the undersides of said tracks, an inverted channel-shaped carriage member adapted to reciprocate along each of said track channels, the arms of said carriage members extending down over said ribs, a pin extending transversely through the arms of said carriage members and through the slots in the first-mentioned channel, a pair of rollers disposed on each pin within said carriage channel member so as to roll against the top edges of each of said construction tracks, and a roller mounted upon each pin between the arms of said first-mentioned channel member so as to roll against the underside of said first-mentioned channel web, and means for locking said carriage members in various positions along said track members.

CLARENCE F. KRAMER.